(12) United States Patent
Xu et al.

(10) Patent No.: US 7,836,283 B2
(45) Date of Patent: Nov. 16, 2010

(54) DATA ACQUISITION MESSAGING USING SPECIAL PURPOSE REGISTERS

(75) Inventors: Zheng Xu, Austin, TX (US); Suraj Bhaskaran, Austin, TX (US); Richard G. Collins, Austin, TX (US); Jason T. Nearing, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 629 days.

(21) Appl. No.: 11/848,826

(22) Filed: Aug. 31, 2007

(65) Prior Publication Data

US 2009/0063805 A1 Mar. 5, 2009

(51) Int. Cl.
*G06F 9/315* (2006.01)
(52) U.S. Cl. .................................................. 712/227
(58) Field of Classification Search .................. None
See application file for complete search history.

(56) References Cited

U.S. PATENT DOCUMENTS

| | | | | |
|---|---|---|---|---|
| 5,590,283 A | * | 12/1996 | Hillis et al. | 712/29 |
| 6,094,729 A | * | 7/2000 | Mann | 714/25 |
| 6,115,678 A | * | 9/2000 | Lieb et al. | 702/122 |
| 6,145,122 A | | 11/2000 | Miller et al. | |
| 6,829,727 B1 | * | 12/2004 | Pawloski | 714/28 |
| 6,877,114 B2 | * | 4/2005 | Allen et al. | 714/45 |
| 7,043,668 B1 | * | 5/2006 | Treue et al. | 714/45 |
| 7,613,840 B2 | * | 11/2009 | Brockhage et al. | 710/5 |
| 2006/0059310 A1 | * | 3/2006 | Asher et al. | 711/126 |

\* cited by examiner

*Primary Examiner*—Eric Coleman
(74) *Attorney, Agent, or Firm*—Kim-Marie Vo; James L. Clingan, Jr.

(57) ABSTRACT

A method provides a data acquisition message of a data processing system to an external port thereof. Configuration information is written to a configuration register. It is determined if the configuration information identifies a data acquisition operation. If the data acquisition operation has been identified, data corresponding to the configuration information is written to a data register. The data in the data register and the configuration information in the configuration register are formatted into the data acquisition message. The data acquisition message is sent to the external port of the data processing system.

17 Claims, 3 Drawing Sheets

DATA ACQUISITION MESSAGING USING SPECIAL PURPOSE REGISTERS

BACKGROUND

1. Field

This disclosure relates generally to data processing systems, and more specifically, to data acquisition messaging for debugging data processing systems.

2. Related Art

Traditionally, data acquisition for an external debugger has been achieved using software writes to appropriate locations in a memory. As part of this traditional process, the external debug module supplies an address to be used to monitor data values of interest. That address is then stored in the user base address (UBA) register. The debug logic associated with a data processing system then compares the addresses being accessed to the address stored in the UBA. If there is a match, the debug logic then provides data corresponding to the address to the external debugger in the form of a data acquisition message.

The traditional data acquisition process has several disadvantages. First, the traditional data acquisition process requires an address comparison. If the address of interest is a virtual address, then the address comparison has to happen before the memory management unit address translation and thus could be speculative. Second, the traditional data acquisition process requires access to the memory subsystem, which can result in the cache being impacted by the debug process. For example, a cache miss may occur as a result of data movement out of the cache when the memory subsystem is accessed.

Accordingly, there is a need for improved data acquisition messaging for debugging data processing systems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Data acquisition message generation for a debugging environment is described. In one aspect, a method of providing a data acquisition message from a data processing system is provided. The method includes performing a write of configuration information to a configuration register. The method further includes determining if the configuration information identifies a data acquisition operation. The method further includes if the data acquisition operation has been identified, writing data corresponding to the configuration information to a data register. The method further includes formatting the data in the data register and the configuration information in the configuration register into the data acquisition message. The data acquisition message may be sent to an external terminal of the data processing system for storage in a trace collection module or it may be stored in a trace buffer inside the data processing system.

In another aspect, a data processing system having an external port is provided. The data processing system includes a configuration register and a data register. The data processing system further includes an execution unit, coupled to the configuration register and the data register that moves configuration data to the configuration register and data to the data register. The data processing system further includes a debug unit that determines if the configuration data being moved by the execution unit to the configuration register indicates that the data being moved to the data register is for use in an acquisition message and that prepares the data acquisition message for coupling to the external port, wherein the data acquisition message includes at least some contents from both the configuration register and the data register.

In yet another aspect, a method of providing a data acquisition message from a data processing system is provided. The method includes performing a first move-to instruction to copy configuration information from a general purpose register group of configuration information to a configuration register, wherein the configuration information includes attribute information of data present in the general purpose register group. The method further includes determining if the configuration information identifies a data acquisition operation. The method further includes if the data acquisition operation is identified, performing a second move-to instruction to copy the data in the general purpose register group to a data register. The method further includes formatting the data in the data register and the configuration information in the configuration register into the data acquisition message. The method further includes sending the data acquisition message to an external port of the data processing system.

Figure 1:
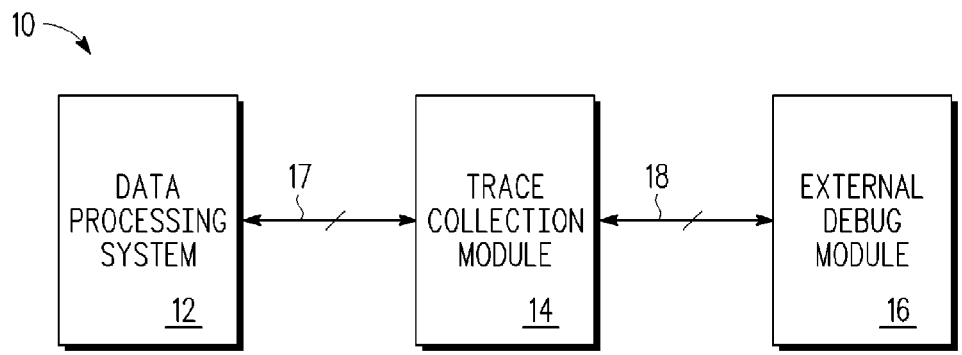
FIG. 1 shows an exemplary block diagram of a debugging system environment.

FIG. 1 shows an exemplary block diagram of a debugging system environment 10. Debugging system environment may include a data processing system 12, a trace collection module 14, and an external debug module 16. Data processing system 12 may be a single core processor, a multiple core processor, a system on chip, or any device that can be debugged. Although not shown, data processing system 12 may include other components, such as memory, as well. Trace collection module 14 may be a trace collection device which may be used to collect debugging related data, including trace data. External debug module 16 may be a debugging system, such as a NEXUS debugging system. External debug module 16 may be used by a user to debug data processing system 12. Data processing system 12 may communicate with trace collection module 14 via bus 17. External debug module 16 may communicate with trace collection module 14 via bus 18. Although FIG. 1 shows trace collection module 14 and external debug module 16, other embodiments consistent with the invention may not need trace collection module 14 and external debug module 16. Instead, a trace buffer located inside data processing system 12 may be used to accumulate trace message data.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 2:
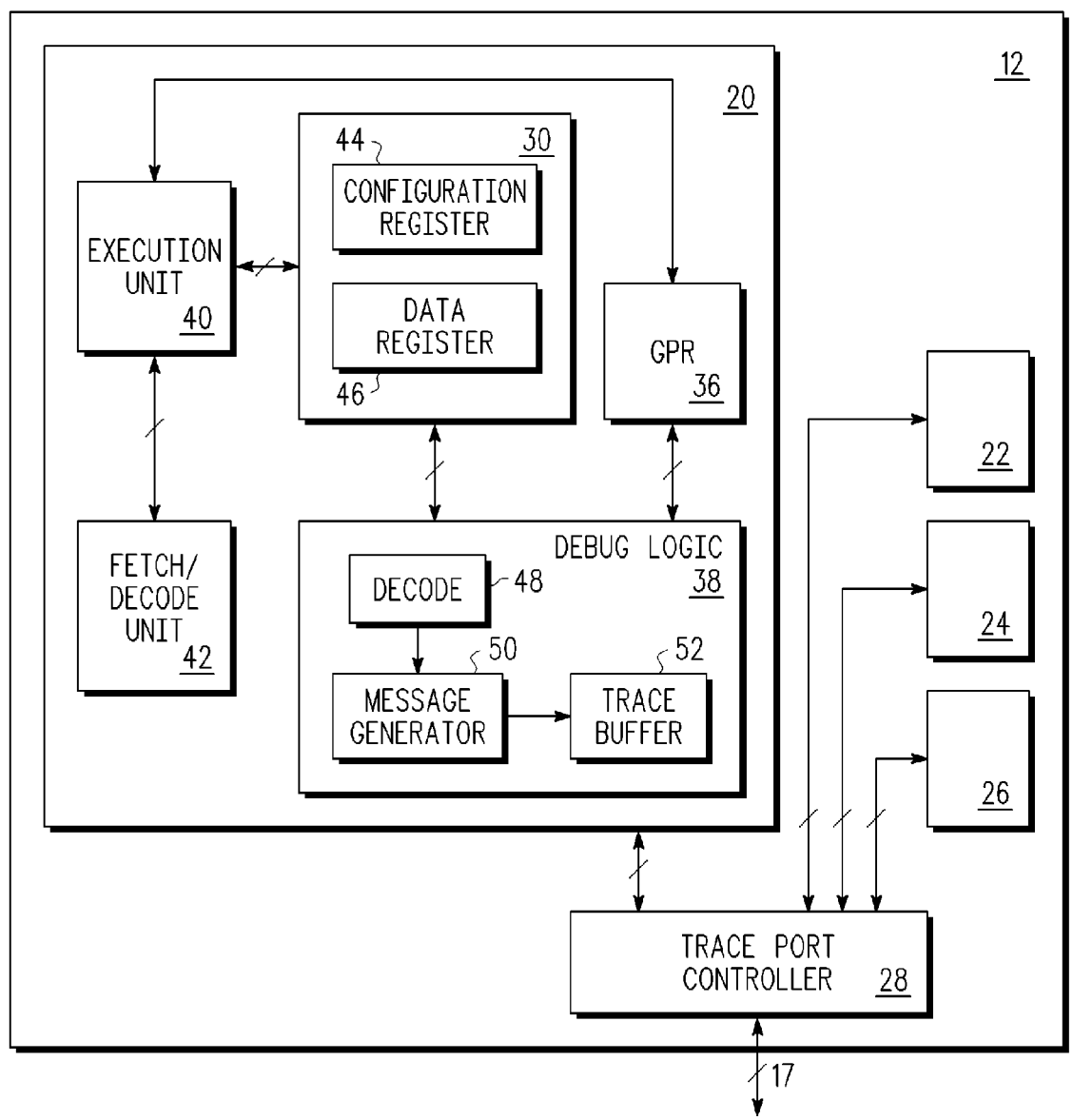
FIG. 2 shows an exemplary block diagram of a data processing system for debugging in the debugging system environment of FIG. 1.

FIG. 2 shows an exemplary block diagram of data processing system 12 for debugging in the debugging system environment of FIG. 1. Data processing system 12 may include processing cores 20, 22, 24, 26, and trace port controller 28. Data processing system 12 may communicate with trace collection module 14 via bus 17 and trace port controller 28. For the sake of convenience only relevant details of processing core 20 are shown. Processing cores 22, 24, and 26 may include similar components. By way of example, processing core 20 may include a set of special purpose registers 30, a set of general purpose registers 36, debug logic 38, an execution unit 40, and a fetch/decode unit 42. Although FIG. 2 shows only one execution unit and only one fetch/decode unit, processing core 20 may include additional execution units and fetch/decode units. In addition, processing core 20 may include many additional components other than the exemplary ones shown in FIG. 2. In one embodiment, fetch/decode unit 42 may fetch instructions from memory (not shown) and decode those instructions. Execution unit 40 may execute those instructions. Set of special purpose registers 30 may include configuration register 44 and a data register 46. Configuration register 44 may be referred to as a service bridge configuration register (SBCR). Data register 46 may be referred to as a service bridge data register (SBDR). This may be particularly so when processing core 20 can support service bridge functionality, including a hardware abstraction layer, to allow various types of debugging and testing via a set of instructions. Additional details concerning configuration register 44 and data register 46 are provided with respect to FIG. 3. Set of general purpose registers 36 may be used to perform arithmetic instructions, including, for example, add, multiply, subtract, and divide instructions.

Referring still to FIG. 2, debug logic 38 may include a decode block 48, a message generator 50, and a trace buffer 52. By way of example, decode block 48 may decode the contents of a special purpose register. For example, decode block 48 may decode the contents of configuration register 44. Message generator 50 may generate a data acquisition message based on the decoded contents of configuration register 44. This process may include formatting the data acquisition message. Trace buffer 52 may be used to buffer the generated data acquisition messages. Trace port controller 28 may receive the data acquisition messages from the trace buffers of the various processing cores and transmit them to trace collection module 14 (shown in FIG. 1). Although FIG. 2 shows a shared trace port controller 28, in a single core data processing system, there may not be a shared trace port controller. Instead, the trace port controller may be included as part of debug logic 38.

Figure 3:
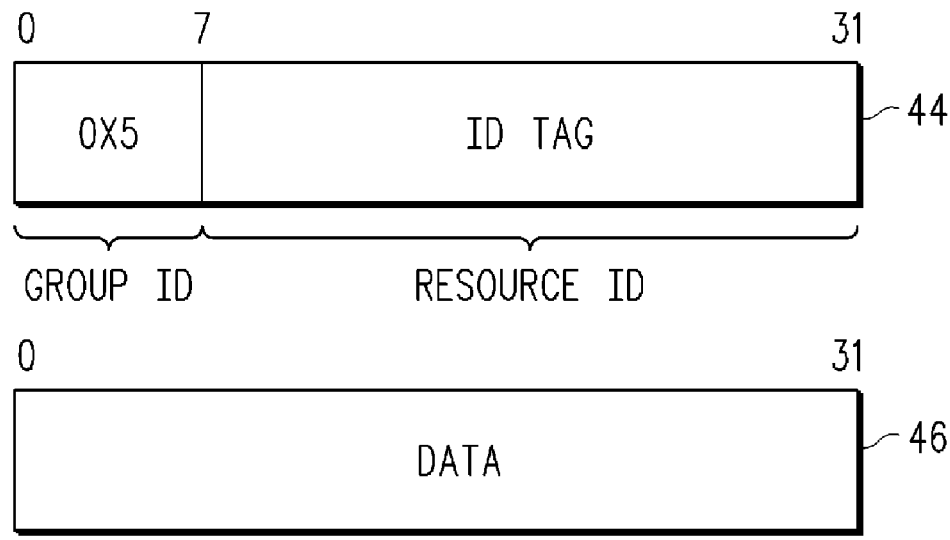
FIG. 3 shows an exemplary format and exemplary contents of special purpose registers included in the data processing system of FIG. 2.

FIG. 3 shows an exemplary format and exemplary contents of special purpose registers included in the data processing system 12 of FIG. 2. In one embodiment, configuration register 44 and data register 46 may only be used for debugging purposes. By way of example, configuration register 44 (also referred to as SBCR) may include two fields: GROUP ID and RESOURCE ID. GROUP ID field may be an 8 bit field and may identify the type of the information that is loaded into configuration register 44 and data register 46. The 8 bit field may have various values, each of which when decoded may let decode logic block 48 determine the nature of the information loaded into configuration register 44. For example, a value of 0x5 may indicate that the information loaded into configuration register 44 relates to data acquisition messaging. RESOURCE ID field may be 24 bits and may include IDTAG information. IDTAG information may identify the nature of data that will be included in data register 46. IDTAG information may provide instrumentation identifier. By way of example, IDTAG information may include attribute information for data included in data register 46. For example, IDTAG information may indicate that the data included in data register 46 relates to a temperature value, a pressure value, or some other value. IDTAG information may be any user defined information. IDTAG information may be used by a user of the data processing system to perform post analysis on the stored trace stream, which may be stored in trace collection module 14, for example. Data register 46 may include data information corresponding to the information provided via configuration register 44.

Figure 4:
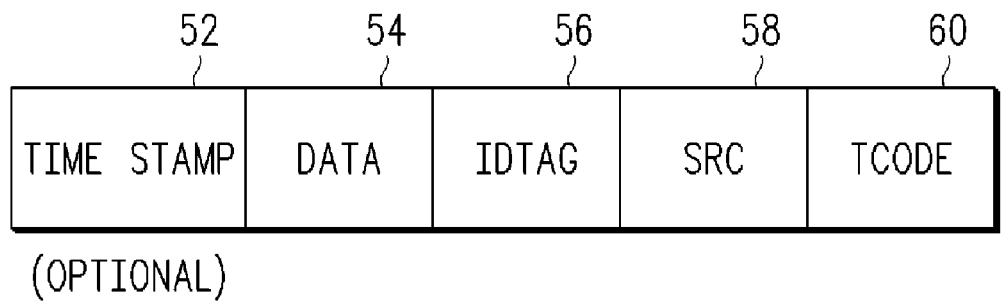
FIG. 4 shows an exemplary format of a data acquisition message generated by a debug logic incorporated in the data processing system of FIG. 2.

FIG. 4 shows an exemplary format of a data acquisition message 50 generated by debug logic 38 incorporated in the data processing system 12 of FIG. 2. By way of example, data acquisition message 50 may be formatted to include several fields, including, timestamp 52 (which is optional), data 54, IDTAG 56, SRC 58, and TCODE 60. Timestamp 52 may include a timestamp corresponding to when the data acquisition message is generated. Data 54 may include data from data register 56. IDTAG 56 may include IDTAG information from configuration register 54. SRC 58 may include information concerning the source of the data and IDTAG information included in the data acquisition message. By way of example, in a multi-core data processing system, SRC 58 may indicate the specific processing core that contains debug logic 38 responsible for generating the data acquisition message at issue. TCODE 60 may be transfer codes allowing for flexible transfer operations using public TCODEs or vendor-defined TCODEs. TCODEs are similar to instruction opcodes in that they allow for various formats and operations. TCODE 60 may identify the transfer format, size, and/or purpose of the data acquisition message.

Figure 5:
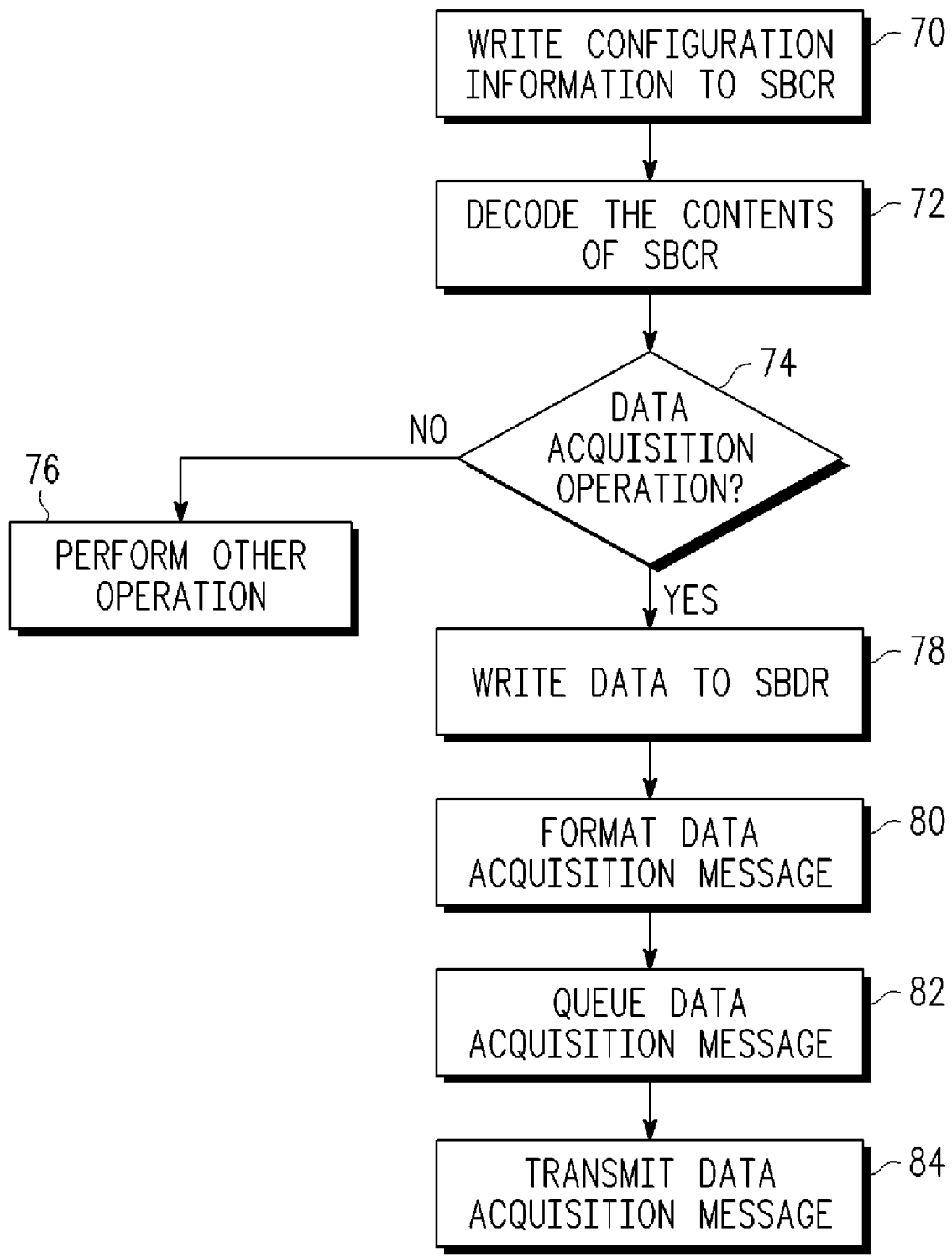
FIG. 5 shows a flowchart for an exemplary method for generating the data acquisition message.

FIG. 5 shows a flowchart for an exemplary method for generating a data acquisition message 50. In one embodiment, the process may begin when data processing system 12 encounters user defined code, including a write configuration information to configuration register 44 (SBCR) (step 70). For example, user defined code may include the following code:

andi G0,G0,0 (this instruction may clear the general purpose register G0);

addi G0,G0,(tag) (this instruction may put tag information into general purpose register G0);

mtspr,SBCR,G0 (this instruction may move the contents of general purpose register G0 to SBCR register).

Next, debug logic 38 may decode the contents of the SBCR register (configuration register 44) (step 72). In one embodiment, decode block 48 of debug logic 38 may perform this step.

After decoding the contents of the SBCR register, debug logic 38 may determine whether the decoded information corresponds to a data acquisition operation (step 74). By way of example, GROUP ID field of configuration register 44 may be decoded to a value 0x5 and that would indicate that the operation is a data acquisition operation. If the decoded value does not correspond to the data acquisition operation, then debug logic 38 may perform another operation (step 76).

If the decoded value corresponds to the data acquisition operation, then when data processing system 12 encounters an instruction requiring that data be written to data register 46, then debug logic 38 may write data information to data register 46 (SBDR) (step 78). For example, user defined code may include the following code:

andi G0,G0,0 (this instruction may clear the general purpose register G0);

addi G0,G0,(data) (this instruction may put data information into general purpose register G0);

mtspr,SBDR,G0 (this instruction may move the contents of general purpose register G0 to SBDR register).

Although not shown in the above exemplary pseudo code, in one embodiment, the SBCR and SBDR are dedicated for debug operations. The "mtspr SBCR" and the "mtspr SBDR" instructions need not be implemented as completion serialized instructions Next, message generator 50 may generate and format data acquisition message (step 80). As part of this step, message generator 50 may create data acquisition message 50, as described above with respect to FIG. 4. In addition, if the next message in the user defined code has the same tag information as the current message, then the next message may be formed by writing data directly to SBDR without modifying the SBCR configuration information. If, however, the next message has different tag information from the current message, then the configuration information in the SBCR may be modified.

Next, debug logic 38 may queue data acquisition message 50 (step 82). By way of example, debug logic 38 may queue data acquisition message 50 in trace buffer 52. Next, trace port controller 28 may transmit data acquisition message 50 (step 84). By way of example, trace port controller 28 may transmit data acquisition message 50 via bus 17 to trace collection module 14. As noted above, in single core data processing systems, trace port controller 28 may be included as part of debug logic 38. In such systems, the functionality of trace buffer 52 and trace port controller 28 may be combined and executed by only one of these modules.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for discussion purpose, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of providing a data acquisition message from a data processing system, comprising:

performing a write of configuration information to a configuration register;

determining if the configuration information identifies a data acquisition operation;

if the data acquisition operation has been identified, writing data corresponding to the configuration information to a data register;

formatting the data in the data register and the configuration information in the configuration register into the data acquisition message; and providing an execution unit that performs only move-to and move-from instructions on a block of registers wherein the configuration register and the data register are included in the block of registers.

2. The method of claim 1, wherein the step of performing is further characterized by copying the configuration information from a general purpose register group to the configuration register.

3. The method of claim 2, wherein the step of writing data is further characterized by copying the data corresponding to the configuration information from the general purpose register group to the data register.

4. The method of claim 3, wherein the step of providing an execution unit is further characterized by the execution unit being further characterized as being able to perform arithmetic instructions using the general purpose register group.

5. The method of claim 1, wherein the step of performing is further characterized by copying the configuration information from a general purpose register group to the configuration register.

6. The method of claim 5, wherein the step of writing data is further characterized by copying the data corresponding to the configuration information from the general purpose register group to the data register.

7. The method of claim 1 further comprising:
providing a debug logic circuit;
sending the data acquisition message to an external terminal of the data processing system; and
queuing the data acquisition message in the debug logic circuit prior to the step of sending the data acquisition message.

8. The method of claim 1, further comprising sending the data acquisition message to an external terminal of the data processing system, and wherein the step of sending the data acquisition message is further characterized by the data acquisition message being sent external to the data processing system through a trace port controller.

9. The method of claim 1, wherein the step of determining is performed using a decode unit.

10. The method of claim 1, wherein the step of formatting is further characterized by including attribute information, from the configuration information, in the data acquisition message.

11. A data processing system, comprising:
a configuration register;
a data register;
an execution unit, coupled to the a configuration register and the data register, that moves configuration data to the configuration register and data to the data register;
a debug unit that determines if the configuration data being moved by the execution unit to the configuration register indicates that the data being moved to the data register is for use in an acquisition message and that prepares the data acquisition message, wherein the data acquisition message includes at least some contents from both the configuration register and the data register; and,
a general purpose register group, wherein the execution unit:
couples the configuration information from the general purpose register group to the configuration register;
couples the data from the general purpose register group to the data register;
executes only move-to and move-from instructions using the data register and the configuration register; and
can execute an arithmetic instructions using general purpose register group.

12. The data processing system of claim 11, wherein the data acquisition message comprises attribute information of the data taken from the configuration information.

13. The data processing system of claim 11, wherein the debug unit comprises a decode unit that determines if the configuration data being moved by the execution unit to the configuration register indicates that the data being moved to the data register is for use in the acquisition message.

14. A method of providing a data acquisition message from a data processing system, comprising:
performing a first move-to instruction to copy configuration information from a general purpose register to a configuration register, wherein the configuration information includes attribute information of data present in the general purpose register group;
determining if the configuration information identifies a data acquisition operation;
if the data acquisition operation is identified, performing a second move-to instruction to copy the data in the general purpose register to a data register; and
formatting the data in the data register and the configuration information in the configuration register into the data acquisition message.

15. The method of claim 14 further comprising placing the data acquisition message in a queue in a debug logic unit.

16. The method of claim 14 further comprising:
providing an execution unit for performing the first and second move-to instructions, wherein the execution unit performs only move-to instructions using the data register and the configuration register and can perform arithmetic instructions using the general purpose register.

17. The method of claim 14 further comprising coupling the data acquisition message to an external port through a trace port controller.

* * * * *